United States Patent [19]

Bonnet et al.

[11] 4,278,942

[45] Jul. 14, 1981

[54] SEAL AND PRESSURE BALANCE SYSTEM FOR AN ELECTRODE-TYPE LOGGING SONDE

[75] Inventors: Jean-Loup Bonnet, Châtenay Malabry; Claude Fierfort, Palaiseau, both of France

[73] Assignee: Schlumberger Technology Corporation, Houston, Tex.

[21] Appl. No.: 963,629

[22] Filed: Nov. 24, 1978

[51] Int. Cl.³ .............................................. G01V 3/18
[52] U.S. Cl. ..................................... 324/347; 324/366; 324/375
[58] Field of Search ................. 324/347, 323, 366, 373

[56] References Cited

U.S. PATENT DOCUMENTS

| | | | |
|---|---|---|---|
| 2,633,485 | 3/1953 | Patnode | 324/347 |
| 2,689,329 | 9/1954 | Zimmerman . | |
| 2,857,451 | 10/1958 | Barclay . | |
| 2,871,444 | 1/1959 | Piety . | |
| 2,964,698 | 12/1960 | Lehmberg . | |
| 3,047,796 | 7/1962 | Bennett et al. | 324/347 |
| 3,072,843 | 1/1963 | Clements et al. | 324/347 |
| 3,223,184 | 12/1965 | Jones et al. | 324/347 X |
| 3,249,857 | 5/1966 | Simon-Suisse . | |
| 3,249,858 | 5/1966 | Gouilloud | 324/339 |
| 3,268,801 | 8/1966 | Clements et al. | 324/347 X |
| 3,293,542 | 12/1966 | Piety . | |
| 3,403,328 | 9/1968 | Fossati et al. | 324/338 |
| 3,772,589 | 11/1973 | Scholberg | 324/373 |

*Primary Examiner*—Gerard R. Strecker

[57] ABSTRACT

In the representative embodiment of the invention disclosed herein, an electrical logging tool is arranged to include an axial body around which a plurality of annular electrode members and insulating members are alternately stacked to achieve a particular configuration of formation-measuring electrodes. Fluid seals are arranged between the annular members and the stack is compressed between the ends of the axial body for defining an oil-filled chamber within the tool body.

11 Claims, 3 Drawing Figures

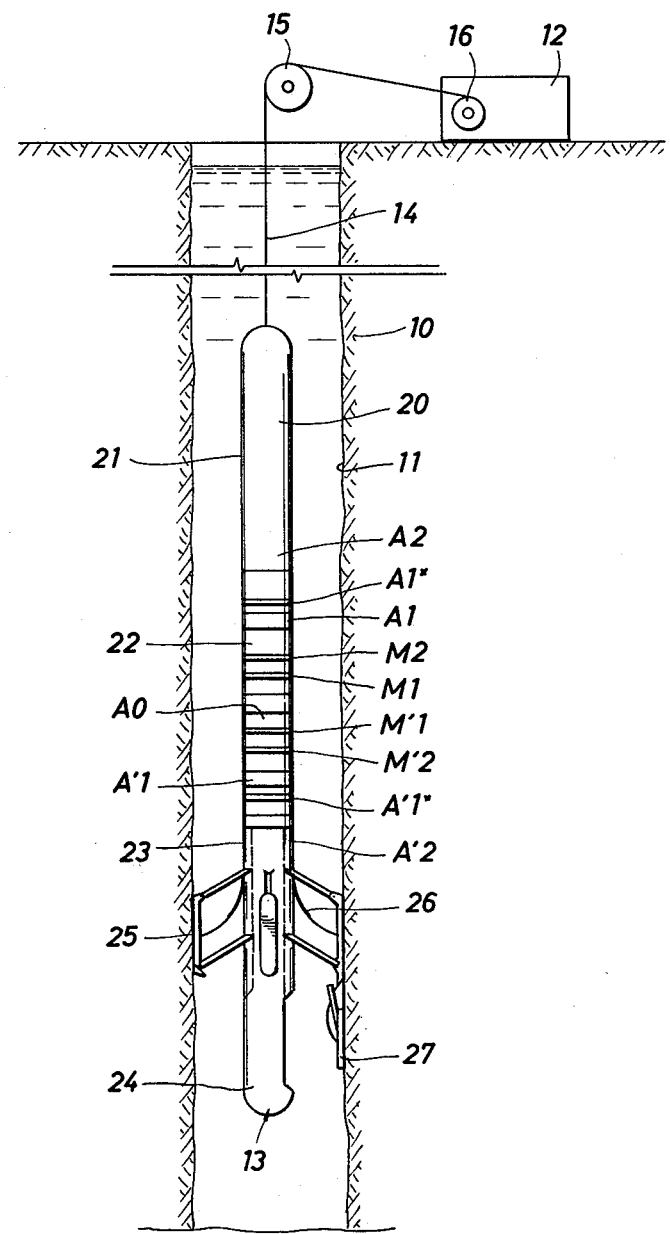

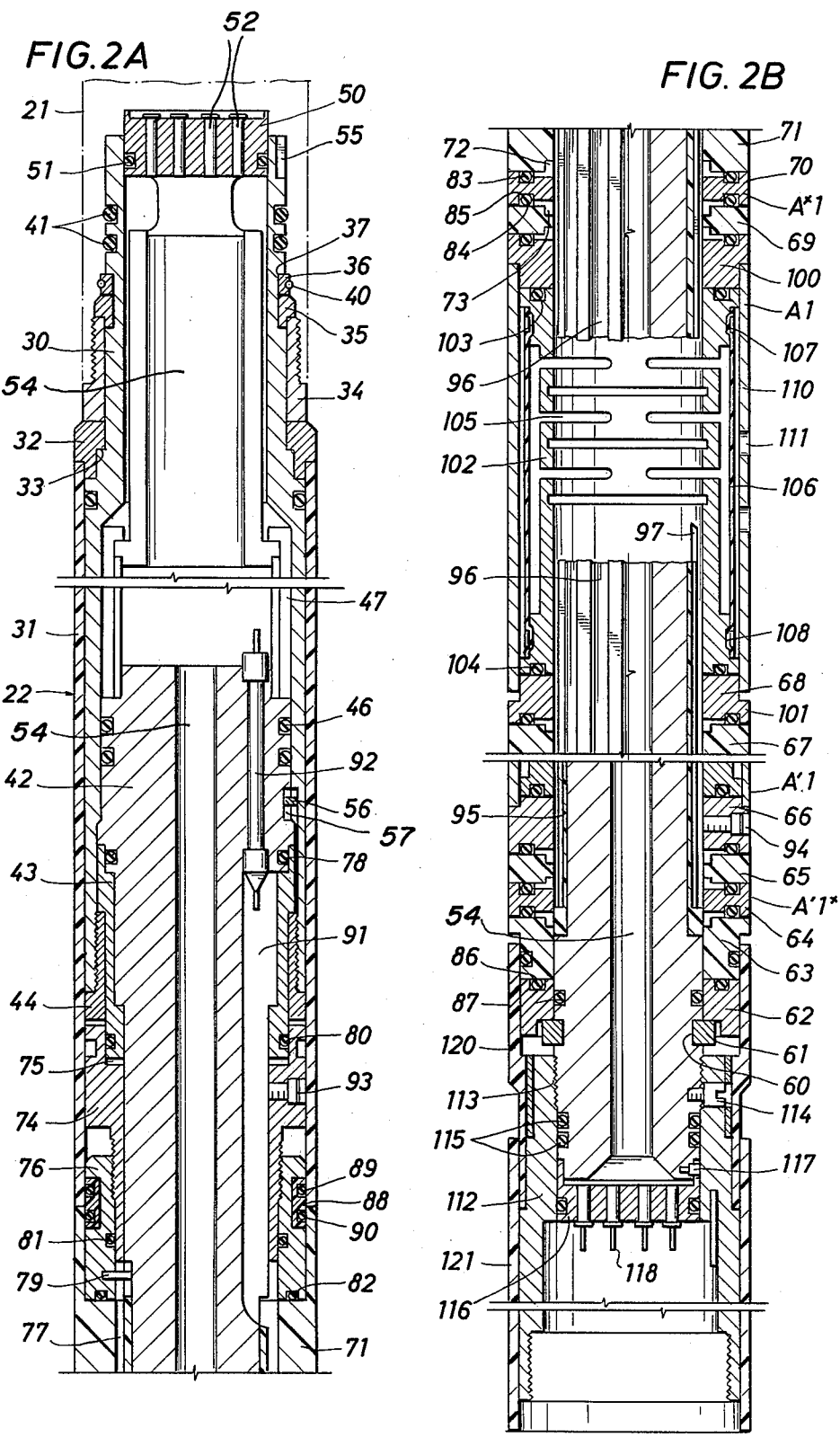

SEAL AND PRESSURE BALANCE SYSTEM FOR AN ELECTRODE-TYPE LOGGING SONDE

BACKGROUND OF THE INVENTION

To measure the resistivity of earth formations, a typical logging tool is arranged to include a series of annular electrodes arranged on a central mandrel. The electrodes make it possible to send a measurement current and a focusing current into the formations and to measure at different points on the tool body the potential created by these currents. This logging technique is well known and an example of a logging tool arranged to make measurements at two investigation depths is described in the U.S. Pat. No. 3,772,589 issued to Scholberg.

A conventional electrode-type logging tool comprises a metallic mandrel covered with an insulating sleeve on which is fitted a stack of rings consisting alternately of conducting electrodes and insulating spacers. The wiring of the sonde, whose main function is to connect the electrodes respectively to the connectors of the sonde head, is placed in a space between the inside of the rings and the outside of the insulating sleeve. This space is not sealed and the borehole fluids such as drilling mud can penetrate therein by flowing between the rings. The wiring and the insulating sleeve are thus exposed to the electrically-conductive and corrosive drilling muds often found in the borehole. There is thus a possibility of insulation loss in the event of a very small cut in the insulation covering this wiring or in the sleeve. Moreover, it is difficult to clean the mid which has penetrated under the rings, thus involving snode dismantling problems and making practically impossible the checking of the insulation between electrodes after utilization in a borehole.

SUMMARY OF THE INVENTION

It is the object of this invention to provide an electrode-type logging tool whose wiring is protected from borehole fluids in order to obtain better reliability.

To accomplish this, the invention includes a logging tool made up of a mandrel capable of being suspended in a borehole and a plurality of rings or annular members stacked around the mandrel and resting on one end of the mandrel, with these rings respectively being arranged as required to provide various electrodes and spacers. The logging tool comprises sealing means defining a fluid-tight space around the mandrel and inside the rings that is filled with an electrically-nonconductive fluid such as silicone oil. Means connected to the other end of the mandrel bear on the opposite end of the stacked annular members to apply a compressive force to this stack. Expansible means are arranged between the space and the outside of the tool body for balancing the pressure of the fluid in the sealed space in relation to the borehole pressure.

In the disclosed preferred embodiment of the present invention, the electrodes are centered in relation to the mandrel by an insulating sleeve formed, for example, of an epoxy resin mixed with glass fiber and placed around the mandrel. The electrical conductors connected to the electrodes are placed in the fluid-tight space and this space is filled with insulating fluid. Biasing means having a high degree of stiffness are inserted in the stack of rings to maintain the compressive force applied to the rings should there be variations in the relative length of the stack and of the mandrel.

The characteristics and advantages of the invention will appear better from the following description with reference to the accompanying drawings in which:

FIG. 1 is a diagram of a logging tool comprising a tool body in accordance with the invention suspended in a borehole; and FIGS. 2A and 2B are longitudinal sections of a tool body in accordance with the invention and representing respectively the upper and lower parts of the body.

DESCRIPTION OF THE PREFERRED EMBODIMENT

Referring to FIG. 1, logging equipment for measuring the resistivity of the formations 10 traversed by a borehole 11 comprises surface equipment 12 and a new and improved logging tool 13 of the present invention that is suspended from a typical electrical cable 14. The suspension cable 14 contains several conductors and is passed over a pulley 15 and spooled on a winch 16 to allow the movement of the logging tool 13 within the borehole 11. The logging tool 13 comprises an upper section 20 formed by a sealed hollow body member 21 containing electronic circuits, an intermediate electrode-carrying section 22, and a lower section 23 with pads. The lower section of the logging tool 13 comprises a body member 24 and four circumferentially-spaced centering pads 25 centering the body member 24 in the borehole 11. These pads 25, biased outwardly by arcuate springs 26, can be retracted against the body member by a hydraulic system placed at the upper part of the section 23. To one of the centering pads 25 is connected a measurement pad 27 to measure the resistivity (or conductivity) of the formations 10 in a zone very near the wall of the borehole. Circuits associated with the pad 27 are contained in the lower section 23. The intermediate section 22 is made up mainly of an axial body or central mandrel around which is stacked a plurality of electrodes respectively separated by insulating spacers to collectively form an electrode assembly adapted to measure the resistivity of the formations 10 at different depths of lateral investigation. In addition to the pad 27, one thus achieves a double resistivity measurement such as described in the aforementioned Scholberg patent. As described fully in that patent, the intermediate section 22 has nine spatially-disposed electrodes (designated $A^*_1$, $A_1$, $M_2$, $M_1$, $A_o$, $M'_1$, $M'_2$, $A'_1$, $A'_1{}^*$) with two other electrodes $A_2$ and $A'_2$ being made up of the respective body members 21 and 24 of the upper and lower sections 20 and 23. The role of the different electrodes connected in pairs is explained in detail in the aforementioned patent.

The intermediate electrode-supporting section 22 of the new and improved logging tool 13 of the present invention is shown in detail in FIGS. 2A and 2B. This section 22 includes a tubular casing 30 which fits into the body member 21 of the upper section 20. Around the casing 30 is placed an insulating sheath 31 secured against upward movement by a collar 32 which bears on a shoulder 33 of the casing. The sheath 31 forms the insulating part located between the electrode $A_2$ made up of the body member 21 and the electrode $A'_1$ which will be subsequently described with reference to FIG. 2B. The intermediate section 22 comprises means for fixing the casing 30 to the body member 21. A threaded collar 34 mounted rotatably on the casing 30 and bearing downward on the collar 32 is secured against upward movement by two lower half-rings 35 and two upper half-rings 36 placed in an annular groove 37 of the casing. The two upper half-rings 36 are kept in place in the groove 37 by a flexible retaining ring 40. The threaded collar 34 is screwed into the body member 21 and sealing members such as O-rings 41 are placed in annular grooves of the casing 30 to provide fluid sealing between the casing and the outer body member.

The casing 30 is fitted on the upper part of a mandrel 42 and secured to said mandrel by attachment means. The mandrel 42 has two downwardly-facing successive shoulders against which bears a force-transmitting sleeve 43 surrounding the mandrel. Around the sleeve 43 is rotatably mounted a threaded collar 44 which bears upwardly against a shoulder of this sleeve and which is screwed into the lower threaded end of the casing 30. O-rings 46 provide sealing between the casing 30 and the mandrel 42. Inside the casing 30 is placed a frame 47 fixed to the mandrel 42 by screws (not shown) and supporting on its upper end a head 50 equipped with a O-ring 51 preventing the ingress of dust into the casing 30 when the latter is disconnected from the body member 21. The head 50 is traversed by typical feed-through connectors 52. Suitable electrical circuits are fixed on the frame 47 and connected electrically to some of the connectors 52. Inside the casing 30 is an air-filled sealed space which remains substantially at atmospheric pressure. This space is extended by an axial bore 54 which goes through the mandrel 42 from top to bottom. The upper part of the casing 30 has a longitudinal groove 55 which allows the body member 21 to be aligned in relation to the casing 30. Moreover, a radial pin 56, fixed in the mandrel, engages in a longitudinal groove 57 of the casing to line the latter up with respect to the mandrel 42.

Around the mandrel 42 are alternately stacked annular members or rings that respectively comprise electrically-conductive electrodes such as $A^*_1$, $A_1$, $A'_1$, $A'^*_1$ interspersed between insulating spacers. Seals are placed between the rings, and the stack of rings is compressed between the two ends of the mandrel to insure tightness of the seals in the event of the bending of the tool body. The lower end of the mandrel 42 (FIG. 2B) has a peripheral groove 60 in which are placed two split-ring thrust members 61 which support a stack of annular members comprising, from the bottom up, a lower end ring 62, a spacer 63, an $A'^*_1$ electrode, a spacer 65, an $A'_1$ electrode 66, an alternating series of spacers and electrodes $M'_2$, $M'_1$, $A_o$, $M_1$, $M_2$ (not shown), a spacer 67, an $A_1$ electrode 68, a spacer 69, an $A^*_1$ electrode 70 and a spacer 71. Each electrode, for example 70, is extended upwardly by a smaller-diameter flange such as 72 on which is centered the spacer immediately above. Each electrode has another symmetrical smaller-diameter flange, such as 73, facing downwardly and used for centering the spacer immediately below.

Means are arranged above the spacer 71 to compress the stacked electrodes and spacers with a given prestress. These means include a crown fitting 74 mounted around the mandrel 42 and bearing on the force-transmitting sleeve 43 via a washer 75. The crown fitting 74 has a threaded part on which is screwed a compression bushing 76 in contact with the upper face of the spacer 71. To compress the stack of electrodes and spacers between the compression bushing 76 and the lower split-rings 61, the crown fitting 74 is screwed in relation to the compression bushing which is prevented from rotating by a lateral pin 79 engaged in a longitudinal groove of the mandrel 42. The compression bushing 76 thus moves downwardly and exerts a compressive force on the stacked annular members. The space 77 between the mandrel 42 and the stacked rings is insulated from the outside by annular members placed in a suitable manner. Sealing is provided between the sleeve 43 and the mandrel 42 by an O-ring 78, between the sleeve 43 and the crown fitting 74 by a seal or O-ring 80, between the crown fitting 74 and the compression bushing 76 by a seal or O-ring 81, and between the compression bushing and the upper spacer 71 by a seal 82. Moreover, a circular groove is cut in the upper opposing face and the lower opposing face of each electrode for receiving a seal (for example O-rings 83 and 84 for the electrode 70) that sealingly contacts the opposed face of the next-adjacent spacer. A radial groove as at 85 allows each circular seal groove to communicate with the fluid space 77 so as to balance the pressure of these grooves with the borehole pressure. On top, the space 77 is sealed in relation to the outside of the sonde by means of a seal or O-ring 86 mounted in a circular groove on the upper face of the end ring 62, and by a seal or O-ring 87 mounted in a peripheral groove of the mandrel located under the annular member 62. To avoid excessive bending of the logging tool 13 resulting in a loss of sealing between the stacked annular members such as when the tool is raised by one end, a compressive prestress is applied to the stacked members. It was found that suitable prestressing was of the order of 2,500 daN.

The compression bushing 76 also has an insulating annular part 88 with peripheral grooves in which are placed seals or O-rings 89 and 90. This assembly provides an insulating junction between the sheath 31 which extends down below the seal 89 and the upper spacer 71 which covers the seal 90 upward. Regularly spaced longitudinal grooves 91 are cut in the mandrel 42 so as to open outwardly, i.e., toward the sleeve 43 and the crown fitting 74. In the extension of these grooves upward, longitudinal passages cut in the mandrel 42 receive insulated electrical connectors 92 which constitute sealed lead-ins between the inside of the air-filled casing and the oil-filled space 77 at the pressure of the borehole 11. Conductors located in the space 77 connect the lower part of the feed-through connectors 92 to the electrodes in accordance with a suitable wiring arrangement. The fluid-tight space 77 is filled with an insulating silicone oil. To allow filling, a sealed upper plug 93 is screwed into the crown fitting 74 and a sealed lower plug 94 into the bottom of the $A'_1$ electrode 66.

An insulating sleeve 95 made, for example, of epoxy resin and glass fiber is placed in the space 77 and fitted around the mandrel 42. This sleeve can be cut longitudinally so as to form two half-shells allowing disassembly and has longitudinal grooves 96 carrying conductive bars or rods (not shown) which are arranged as required for interconnecting adjacent pairs of the electrodes to achieve a given tool configuration. The insulating sleeve 95 centers the electrodes on the mandrel, the spacers themselves being centered in relation to the electrodes by means of flanges 72 and 73.

The tool 13 also includes expansible pressure-balancing means for regulating the pressure of the space 77 with respect to that of the fluids in the borehole 11 and biasing means adapted for applying a substantially-constant compressive prestressing force to the stacked members in case of variations in the relative length of the stack and of the mandrel 42 as there are volumetric changes in the silicone oil caused by thermal expansion and contraction. These different means are located at the level of the $A_1$ and $A'_1$ electrodes. The $A'_1$ electrode is similar to the $A_1$ electrode 68 which includes an upper crown fitting 100 and a lower crown fitting 101 between which is placed a tubular body member 102 equipped at its ends with seals 103 and 104. The tubular body member 102 is made flexible by means of transverse slots 105 so as to form a stiff spring which cooperatively serves to apply an axial biasing force against the stacked annular members. Pairs of slots 105 which open in opposite radial directions are cut at regular intervals along the body member 102. Two pairs of successive slots open in radial directions 90 degrees from each other. Around the tubular body member is placed an expansion sleeve 106 fixed on the body member at its ends by collars 107 and 108. The sleeve 106 can be of an elastomer material but it will preferably be made in the form of a gas-impervious metal bellows. In either case, the sleeve 106 is arranged to balance the pressure between the space 77 and the outside of the tool 13. A metal tube 110 welded to the crown fitting 100 and capable of sliding on the crown fitting 101 constitutes the actual electrode $A_1$. The tube 110 is traversed by holes 111 so that the pressure of the borehole fluids can be transmitted to the expansion sleeve 106 and accommodating changes in the volume of the oil in the space 77.

A lower casing 112 is screwed at 113 onto the lower end of the mandrel 42 and prevented from rotating by a screw 114. Seals 115 ensure tightness between this casing 112 and the mandrel 42. A head 116 fixed on the mandrel 42 by screws such as 117 carries male connectors 118 adapted to be plugged into corresponding connectors of the lower section 23 of the downhole tool 13. The electrode $A'_2$ formed by the body member of the lower section 23 is screwed onto, and is hence in electrical contact with, the lower casing 112. To insulate the $A'_1{}^*$ electrode 64 from this electrode $A'_2$, there is provided, on the one hand, a first insulating sheath 120 which covers the lower spacer 63 and part of the casing 112, and, on the other, a second insulating sheath 121 mounted slidably on the casing 112 and the first sheath. After having mounted the lower section 23 in the casing 112, the insulating sheath 121 is made to slide downward so that the insulated part below the $A'_1{}^*$ electrode 64 has a sufficient length. Insulated conductors coming from the upper part of the section 22 go through the axial bore 54 of the mandrel 42 and are connected to the upper part of the connectors 118. These feed-through connectors 118 are thus in air at atmospheric pressure, whereas others located in the fluid-tight space 77 are in oil at the pressure of the borehole 11. However, in both cases, the wiring is not in contact with the conducting fluids of the borehole 11, so that reliability of the tool 13 is achieved.

While a particular embodiment has been described, it is apparent that change and modifications may be made without departing from the scope of the invention.

What is claimed is:

1. A logging tool adapted for the investigation of earth formations traversed by a borehole, comprising:
    a mandrel adapted to be suspended in a borehole;
    a plurality of annular members including a first group of electrically-conductive annular members and a second group of electrically-nonconductive annular members coaxially arranged and axially stacked around said mandrel with the ends of said annular members in abutting contact with one another, and with said electrically-nonconductive annular members respectively serving as insulated spacer members and said electrically-conductive annular members respectively disposed between selected ones of said insulated spacer members to serve as spatially-arranged electrode members;
    means, including said annular members and sealing means cooperatively arranged between adjacent ones of said stacked annular members, for collectively defining a fluid-tight space between the interior of said stacked annular members and at least the portion of the exterior of said mandrel thereadjacent;
    resilient means supported on said mandrel and cooperatively arranged and coupled to said stacked annular members for imposing a compressive load thereon; and
    means supported on said tool in fluid communication with said fluid-tight space and the exterior of said stacked annular members for continuously maintaining a predetermined relationship between the pressure of an electrically-nonconductive fluid contained in said fluid-tight space and the pressure existing at the exterior of said stacked annular members.

2. The logging tool of claim 1 further including electrical insulating means cooperatively arranged between said mandrel and at least some of said stacked annular members and adapted for maintaining at least those stacked annular members centered around said mandrel.

3. The logging tool of claims 1 or 2 wherein said means for imposing a compressive load on said stacked annular members includes biasing means cooperatively associated with said annular members and adapted for applying an axially-directed load on said stacked annular members.

4. The logging tool of claims 1 or 2 further including means on at least some of said annular members for centering the next-adjacent ones of said stacked annular members.

5. The logging tool of claims 1 or 2 wherein said sealing means includes a sealing member placed between the opposing ends of each of said stacked annular members.

6. The logging tool of claims 1 or 2 wherein said sealing means includes means defining a groove in one end of each of said stacked annular members adapted for at least partially receiving a sealing member, and a sealing member operatively arranged in each of said grooves and respectively adapted for sealingly engaging the opposing end of the next-adjacent ones of said stacked annular members.

7. The logging tool of claim 6 further including passage means communicating said grooves with said fluid-tight space.

8. The logging of claims 1 or 2 further including electrical conductors within said fluid-tight space operatively connected to said electrode members.

9. The logging tool of claims 1 or 2 further including means defining a wire passage through the interior of said mandrel, and means fluidly sealing said wire passage from said fluid-tight space.

10. A logging tool adapted for the investigation of earth formations traversed by a borehole, comprising:
    (a) a mandrel adapted to be suspended in a borehole,
    (b) a plurality of annular members including a first group of electrically-conductive annular members and a second group of electrically-nonconductive annular members coaxially arranged and axially stacked around said mandrel with the ends of said annular members in abutting contact with one another, and with said electrically-nonconductive annular members respectively serving as insulated spacer members and said electrically-conductive annular members respectively disposed between selected ones of said insulated spacer members to serve as spatially-arranged electrode members, (c) means, including said annular members and sealing means cooperatively arranged between adjacent ones of said stacked annular members, for collectively defining a fluid-tight space between the interior of said stacked annular members and at least the portion of the exterior of said mandrel thereadjacent, (d) resilient means supported on said mandrel and cooperatively arranged and coupled to said stacked annular members for imposing a compressive load thereon, (e) means supported on said tool in fluid communication with said fluid-tight space and the exterior of said stacked annular members for continuously maintaining a predetermined relationship between the pressure of an electrically-nonconductive fluid contained in said fluid-tight space and the pressure existing at the exterior of said stacked annular members, (f) wire passage means within said tool, including said fluid-tight space and a wire passage through said mandrel, for protecting electrical conductors within said tool from borehole fluids, and (g) electrical conductors within said wire passage means operatively connected to said electrode members and protected from borehole fluids by said wire passage means.

11. A logging tool adapted for the investigation of earth formations traversed by a borehole, comprising:

(a) a mandrel adapted to be suspended in a borehole, (b) a plurality of annular cylindrical members including a first group of electrically-conductive annular members and a second group of electrically-nonconductive annular members coaxially arranged and axially stacked around said mandrel with the ends of said annular members in abutting contact with one another, and with said electrically-nonconductive annular members respectively serving as insulated spacer members and said electrically-conductive annular members respectively disposed between selected ones of said insulated spacer members to serve as spatially-arranged electrode members, (c) electrical insulating means cooperatively arranged between said mandrel and at least some of said stacked annular members and adapted for maintaining at least those stacked annular members centered around said mandrel, (d) means on at least some of said annular members for centering the next-adjacent ones of said stacked annular members, (e) means, including said annular members and sealing means cooperatively arranged between adjacent ones of said stacked annular members, for collectively defining a fluid-tight space between the interior of said stacked annular members and at least the portion of the exterior of said mandrel thereadjacent, said sealing means including means defining a groove in one end of each of said stacked annular members adapted for at least partially receiving a sealing member, and a sealing member operatively arranged in each of said grooves and respectively adapted for sealingly engaging the opposing end of the next-adjacent ones of said stacked annular members, (f) passage means communicating said grooves with said fluid-tight space, (g) resilient biasing means supported on said mandrel and cooperatively arranged, associated with, and coupled to said stacked annular members for applying an axially-directed compressive load thereon, (h) means supported on said tool in fluid communication with said fluid-tight space and the exterior of said stacked annular members for continuously maintaining a predetermined relationship between the pressure of an electrically-nonconductive fluid contained in said fluid-tight space and the pressure existing at the exterior of said stacked annular members, (i) means defining a wire passage through the interior of said mandrel, and means fluidly sealing said wire passage both from said fluid-tight space and from borehole fluids outside said tool, and (j) electrical conductors within said wire passage and said fluid-tight space operatively connected to said electrode members and protected from borehole fluids by said wire passage and said fluid-tight space.

* * * * *